(12) United States Patent
Vaccaro

(10) Patent No.: US 11,329,466 B2
(45) Date of Patent: May 10, 2022

(54) CABLE HANGER ASSEMBLIES

(71) Applicant: CommScope Technologies LLC, Hickory, NC (US)

(72) Inventor: Ronald A. Vaccaro, Taylorsville, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/514,146

(22) Filed: Jul. 17, 2019

(65) Prior Publication Data

US 2020/0036176 A1    Jan. 30, 2020

Related U.S. Application Data

(60) Provisional application No. 62/703,930, filed on Jul. 27, 2018.

(51) Int. Cl.
    *H02G 3/00*      (2006.01)
    *H02G 3/32*      (2006.01)

(52) U.S. Cl.
    CPC ............... *H02G 3/263* (2013.01); *H02G 3/32* (2013.01)

(58) Field of Classification Search
    CPC .................................. H02G 3/263; H02G 3/32
    See application file for complete search history.

(56) References Cited

U.S. PATENT DOCUMENTS 2,393,071 A * 1/1946 Schaelchlin .......... F16F 3/0873
                                                                                 248/635
2,964,728 A * 12/1960 Wilson ................... H01R 4/643
                                                                                 439/806

(Continued)

FOREIGN PATENT DOCUMENTS

CN      101331327 A      12/2008
CN      106015762 A      10/2016
(Continued)

OTHER PUBLICATIONS

Definition of the term "flat" https://www.google.com/search?q=google+dictionary&rlz=1C1GCEB_enUS776US776&oq=google+dic&aqs=chrome.0.0j69i57j0l6.4283j0j1&sourceid=chrome&ie=UTF-8#dobs=flat (Year: 2020).*

(Continued)

*Primary Examiner* — Anita M King
(74) *Attorney, Agent, or Firm* — Myers Bigel, P.A.

(57) ABSTRACT

The present disclosure describes a cable hanger assembly. The cable hanger assembly comprises a support structure, a cable hanger, and a mounting assembly. The cable hanger comprises a front shell half that mates with a rear shell half. The front shell half and the rear shell half have a front shell half inner surface and a rear shell half inner surface that cooperate with each other to secure a cable within a cable receptacle. The cable hanger further comprises a front shell bolt aperture through the front shell half and a rear shell half bolt aperture through the rear shell half where the front shell half bolt aperture aligns with the rear shell half bolt aperture when the front shell half is mated to the rear shell half. The mounting assembly comprises a threaded bolt, a plurality of flat washers formed of a non-metallic material, and a plurality of nuts formed of a non-metallic material. The mounting assembly may optional comprise a lock washer formed of a non-metallic material. The threaded bolt extends through the front and rear shell half bolt apertures and is secured with the plurality of flat washers, optional lock washer and nuts to retain the cable hanger to the support structure.

20 Claims, 3 Drawing Sheets

(56) References Cited

U.S. PATENT DOCUMENTS

| | | | |
|---|---|---|---|
| 3,194,292 A * | 7/1965 | Borowsky | F16B 39/24 411/155 |
| 3,843,083 A | 10/1974 | Angibaud | |
| 3,856,244 A * | 12/1974 | Menshen | F16L 3/237 248/67.5 |
| 4,433,824 A * | 2/1984 | Koosha | F16M 11/12 248/188.4 |
| 4,707,051 A * | 11/1987 | Hall | H01R 4/44 439/781 |
| 5,257,768 A | 11/1993 | Juenemann et al. | |
| 5,271,588 A | 12/1993 | Doyle | |
| 5,794,897 A * | 8/1998 | Jobin | H02G 7/053 24/459 |
| 5,941,483 A | 8/1999 | Baginski | |
| 5,992,802 A * | 11/1999 | Campbell | H02G 3/30 248/68.1 |
| 6,012,886 A * | 1/2000 | Tanamura | A47K 13/26 4/236 |
| 6,102,641 A | 8/2000 | Hildebrandt | |
| 6,609,343 B1 * | 8/2003 | Litten | A63B 71/023 248/228.5 |
| 7,175,138 B2 | 2/2007 | Low et al. | |
| 8,770,537 B2 * | 7/2014 | Go | F16L 3/237 248/560 |
| 9,000,299 B2 * | 4/2015 | Ruth | H02G 3/32 174/72 A |
| 9,670,949 B1 * | 6/2017 | White | F16B 21/09 |
| 10,734,719 B1 * | 8/2020 | Bell | H01Q 1/52 |
| 11,152,682 B2 * | 10/2021 | Pounds | H01Q 1/1264 |
| 2003/0234114 A1 | 12/2003 | Sutehall et al. | |
| 2012/0088406 A1 | 4/2012 | Montena et al. | |
| 2015/0204374 A1 * | 7/2015 | Stewart | F16B 39/282 411/161 |

FOREIGN PATENT DOCUMENTS

| | | |
|---|---|---|
| CN | 205954867 U | 2/2017 |
| CN | 207069471 U | 3/2018 |
| CN | 108019412 A | 5/2018 |
| EP | 2324265 A2 | 5/2011 |
| KR | 1020090035437 | 4/2009 |
| KR | 101325693 | 11/2013 |
| WO | 2010019638 A2 | 2/2010 |

OTHER PUBLICATIONS

International Search Report and Written Opinion corresponding to International Application No. PCT/US2019/042111 dated Oct. 31, 2019.
"Office Action corresponding to Chinese Application No. 201980049007.3 dated Nov. 1, 2021".
Civil Engineering Materials 3rd Edition, Aug. 31, 2017, Edited by Deng Dehua, China Railway Press, pp. 195-197. (no English translation).
Manual of Marine Engineering, Dec. 31, 1982, (USA) S.C. Dexter, Ocean Press, pp. 208-208. (no English translation).
Extended European Search Report dated Mar. 9, 2022, in corresponding European Application No. 19840924.5.
Li, et al., Passive Intermodulation Analysis of Single Contact Junctions of Wire Mesh, J. Comput Electron (2018) 17:101-109.

* cited by examiner

CABLE HANGER ASSEMBLIES

RELATED APPLICATION(S)

The present application claims priority from and the benefit of U.S. Provisional Application No. 62/703,930, filed Jul. 27, 2018, the disclosure of which is hereby incorporated herein in its entirety.

FIELD OF THE INVENTION

The invention relates to cable hanger assemblies.

BACKGROUND OF THE INVENTION

Currently, there a variety of metallic (e.g., stainless steel) components that are used to secure cables to telecommunications towers (e.g., cable hangers). However, the use of metal components near an antenna on cell sites can be a source of unwanted passive intermodulation (PIM) in the modern radio frequency (RF) environment. In near antenna environments, it is critical that metal-to-metal junctions be under high compressive pressure. For example, nuts and washers used to attach cable hangers to a telecommunications tower must be under high compression to be low-PIM junctions.

In recent years, cable hangers formed from polymers have become popular to help reduce PIM. However, over time, the polymer cable hangers can creep (i.e., dimensionally change) in response to the load applied by the washers and/or nuts. This creep can serve to relieve the compressive load on all components in the system. It follows that the compression of the metal-to-metal junctions of the nuts, flat washers, and lock washers will be reduced. This may lead to return trips by a technician to find and repair the assembly to return the PIM to lower levels. Thus, there may be a need for non-metallic, non-magnetic components for cable hanger assemblies that reduce costs and allow for easy installation, while alleviating technical performance concerns, such as, PIM.

SUMMARY OF THE INVENTION

A first aspect of the present invention is directed to a cable hanger assembly. The cable hanger assembly may comprise a support structure, a cable hanger, and a mounting assembly. The cable hanger may comprise a front shell half that mates with a rear shell half. The front shell half and the rear shell half may have a front shell half inner surface and a rear shell half inner surface that cooperate with each other to secure a cable within a cable receptacle. The cable hanger may further comprise a front shell bolt aperture through the front shell half and a rear shell half bolt aperture through the rear shell half where the front shell half bolt aperture aligns with the rear shell half bolt aperture when the front shell half is mated to the rear shell half. The mounting assembly may comprise a threaded bolt, a plurality of flat washers formed of a non-metallic material, a lock washer formed of a non-metallic material, and a plurality of nuts formed of a non-metallic material. The threaded bolt may extend through the front and rear shell half bolt apertures and may be secured with the plurality of flat washers, lock washers and nuts to retain the cable hanger to the support structure.

Another aspect of the present invention is directed to a cable hanger assembly. The cable hanger assembly may comprise a support structure, a cable hanger, and a mounting assembly. The cable hanger may comprise a front shell half that mates with a rear shell half. The front shell half and the rear shell half may have a front shell half inner surface and a rear shell half inner surface that cooperate with each other to secure a cable within a cable receptacle. The cable hanger may further comprise a front shell bolt aperture through the front shell half and a rear shell half bolt aperture through the rear shell half where the front shell half bolt aperture aligns with the rear shell half bolt aperture when the front shell half is mated to the rear shell half. The mounting assembly may comprise a threaded bolt, a plurality of washers that may have a concave cross-section, a lock washer formed of a non-metallic material, and a plurality of nuts. The threaded bolt may extend through the front and rear shell half bolt apertures and may be secured with the plurality of washers, lock washer and nuts to retain the cable hanger to the support structure.

A further aspect of the present invention is directed to a cable hanger assembly. The cable hanger assembly may comprise a support structure, a cable hanger, and a mounting assembly. The cable hanger may comprise a front shell half that mates with a rear shell half. The front shell half and the rear shell half may have a front shell half inner surface and a rear shell half inner surface that cooperate with each other to secure a cable within a cable receptacle. The cable hanger may further comprise a front shell bolt aperture through the front shell half and a rear shell half bolt aperture through the rear shell half where the front shell half bolt aperture aligns with the rear shell half bolt aperture when the front shell half is mated to the rear shell half. The mounting assembly may comprise a threaded bolt, a plurality of washers that may have a concave cross-section, and a plurality of nuts. The threaded bolt may extend through the front and rear shell half bolt apertures and may be secured with the plurality of washers and nuts to retain the cable hanger to the support structure.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF THE INVENTION

Figure 1:
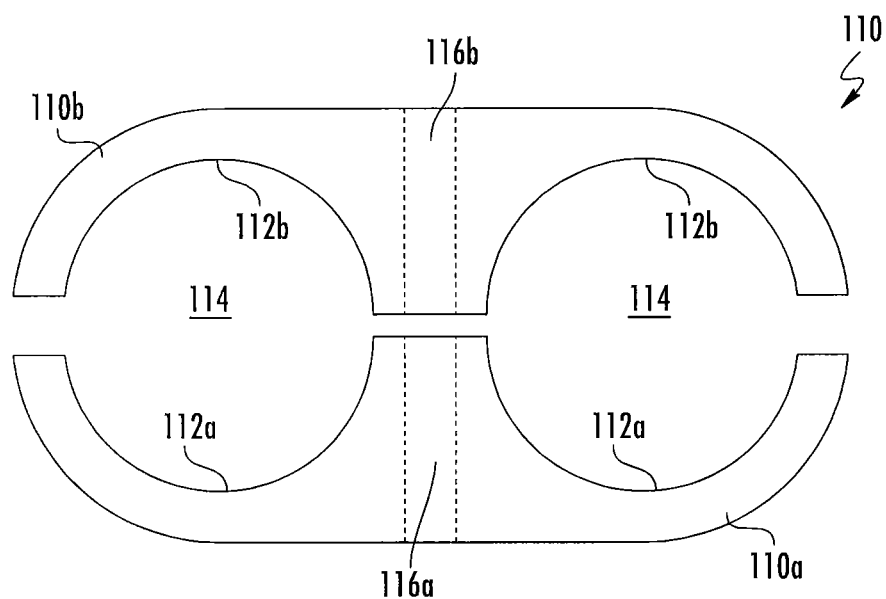
FIG. 1 is a top view of a cable hanger according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, a cable hanger assembly 100 according to embodiments of the present invention is illustrated in FIGS. 1-5. The cable hanger assembly 100 comprises a cable hanger 110, a mounting assembly 120, and a support structure 130 (e.g., an antenna tower).

As shown in FIG. 1, a cable hanger 110 of the present invention may comprise a front shell half 110a that mates with a rear shell half 110b. The front shell half 110a and rear shell half 110b may be each formed of a polymeric material. The front shell half 110a and the rear shell half 110b each may have a respective front shell half inner surface 112a and rear shell half inner surface 112b. The front shell half inner surface 112a and the rear shell half inner surface 112b can cooperate with each other to secure a cable 150 within a cable receptacle 114 (see, e.g., FIG. 5).

In some embodiments, the front shell half inner surface 112a and the rear shell half inner surface 112b of a cable hanger 110 of the present invention may cooperate with each other form more than one cable receptacle 114, thereby being able to secure more than one cable 150 within the cable hanger 110.

A cable hanger 110 of the present invention may further comprise a front shell bolt aperture 116a through the front shell half 112a and a rear shell bolt aperture 116b through the rear shell half 112b. The front shell bolt aperture 116a aligns with the rear shell bolt aperture 116b when the front shell half 112a is mated with the rear shell half 112b. The front shell bolt aperture 116a and the rear shell bolt aperture 116b are sized to fit a threaded bolt 122. In some embodiments, the front shell bolt aperture 116a and the rear shell bolt aperture 116b are sized to fit a threaded bolt 122 having a diameter of 6 mm to about 12 mm.

Figure 2:
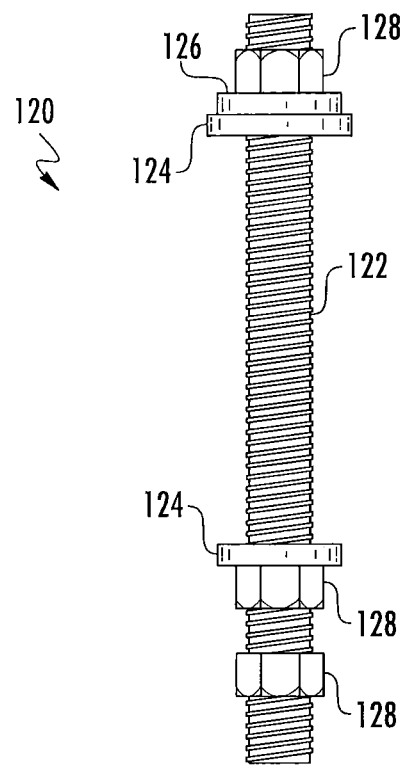
FIG. 2 is a side view of a mounting assembly according to embodiments of the present invention.
Figure 3:
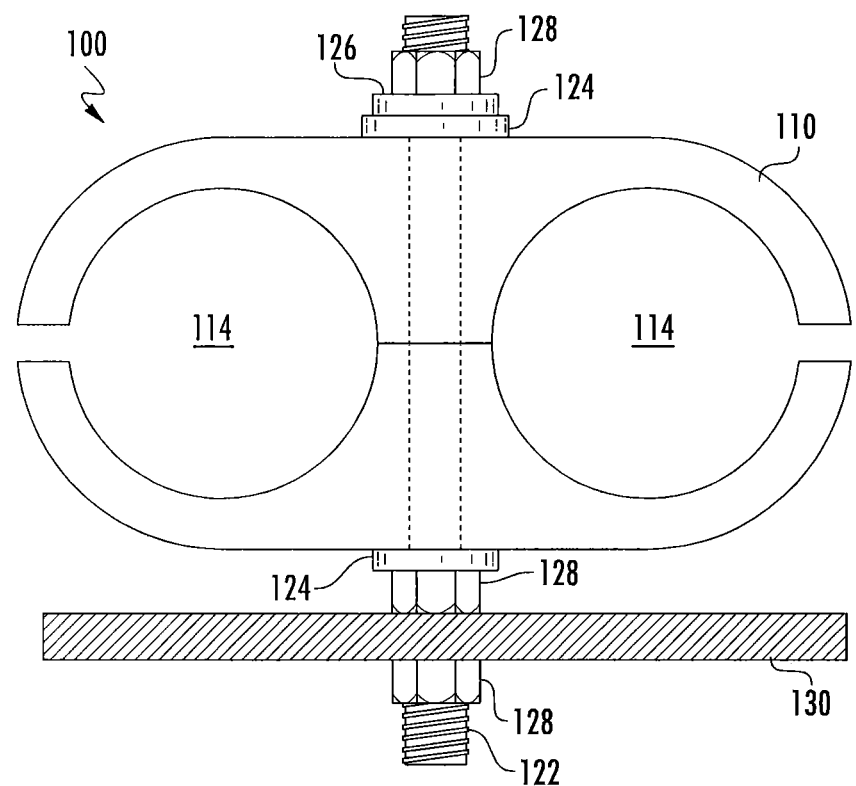
FIG. 3 is a top view of a cable hanger assembly according to embodiments of the present invention.

Referring to FIG. 2, a mounting assembly 120 of the present invention may comprise a threaded bolt 122, a plurality of flat washers 124 and a plurality of nuts 128. A mounting assembly 120 of the present invention may optionally comprise a lock washer 126. The threaded bolt 122 may extend through the front and rear shell half bolt apertures (116a, 116b) and be secured with the plurality of flat washers 124, plurality of nuts 128, and optional lock washer 126, thereby retaining the cable hanger 110 to a support structure 130 (see, e.g., FIG. 3 and FIG. 4). In some embodiments, multiple cable hangers 110 can be stacked (e.g., single, double or triple stacked) and secured to a support structure 130. Exemplary cable hangers are further shown in U.S. Pat. No. 7,175,138 to Low et al. which is incorporated by reference in its entirety herein.

The plurality of flat washers 124, lock washer 126 and plurality of nuts 128 may be sized to fit a threaded bolt 122 having a diameter of about 6 mm to about 12 mm. In some embodiments, the plurality of flat washers 124, lock washer 126 and plurality of nuts 128 may have a diameter of about 6 mm to about 12 mm.

Figure 4:
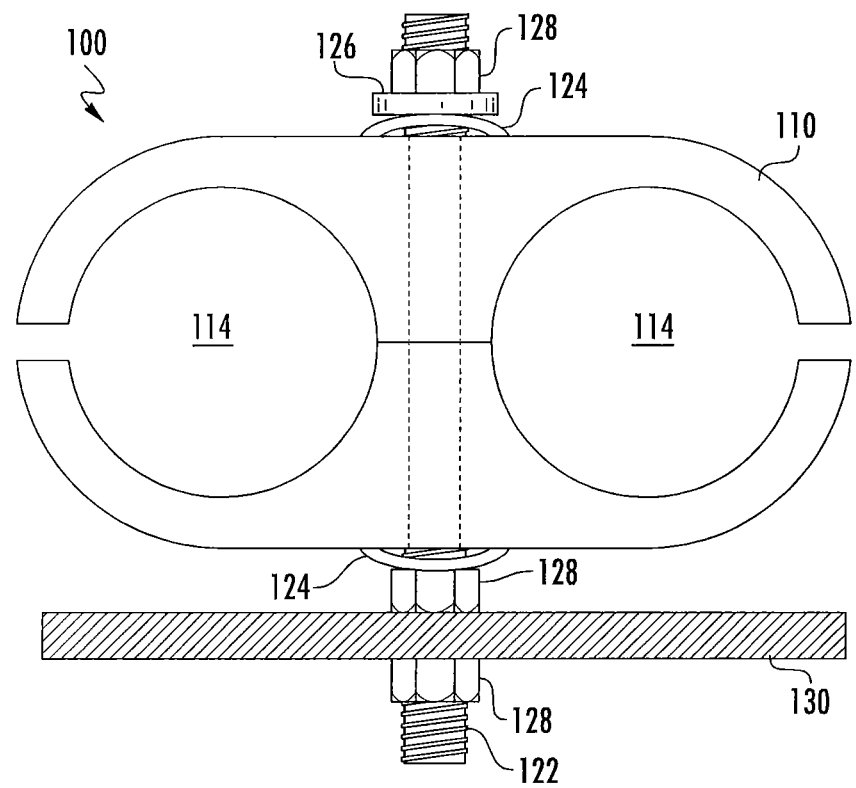
FIG. 4 is a top view of a cable hanger assembly according to further embodiments of the present invention.
Figure 5:
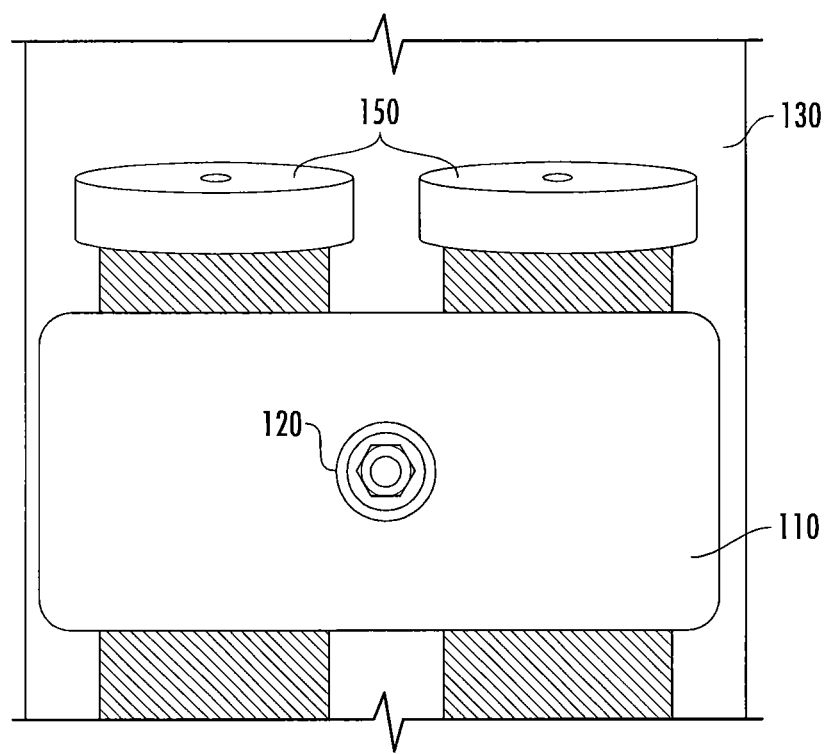
FIG. 5 is a front view of the cable hanger assembly of FIG. 3 in combination with cables.

In some embodiments, the plurality of flat washers 124 and/or the lock washer 126 may have a concave cross-section (see, e.g., FIG. 4). Utilizing flat washers 124 and/or a lock washer 126 having a concave cross-section may store compressive energy which can help reduce (or calibrate) the compressive load on the cable hanger 110. The concave cross-section may also help accommodate any creep that may occur, thereby maintaining the high compression for any metal-to-metal junctions within the cable hanger assembly 100.

The plurality of flat washers 124, lock washer 126, and plurality of nuts 128 may be formed of a non-metallic material. In some embodiments, the non-metallic material forming the plurality of flat washers 124, lock washer 126, and plurality of nuts 128 may comprise a polymeric material. In some embodiments, the polymeric material may comprise nylon, acetal, or polypropylene. For example, in some embodiments, the polymeric material forming the flat washers 124 may comprise nylon, acetal, or polypropylene. In some embodiments, the polymeric material forming the lock washer 126 may comprise nylon, acetal, or polypropylene. In some embodiments, the polymeric material forming the plurality of nuts 128 may comprise nylon, acetal, or polypropylene.

In some embodiments, the threaded bolt 122 may be formed of a polymeric material. For example, in some embodiments, the polymeric material forming the threaded bolt 122 may comprise nylon, acetal, or polypropylene.

The present invention reduces the number of metal-to-metal junctions in the near antenna environment by replacing the metal-to-metal junctions with polymer-to-metal and/or polymer-to-polymer junctions. Thus, the present invention may alleviate technical perfoiniance concerns, such as, PIM.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger assembly, the cable hanger assembly comprising:
   a support structure;
   a cable hanger, the cable hanger comprising:
      a front shell half that mates with a rear shell half, the front shell half and the rear shell half having a front shell half inner surface and a rear shell half inner surface that cooperate with each other to secure a cable within a cable receptacle;
      a front shell bolt aperture through the front shell half and a rear shell half bolt aperture through the rear shell half, wherein the front shell half bolt aperture aligns with the rear shell half bolt aperture when the front shell half is mated to the rear shell half;
   a mounting assembly, the mounting assembly comprising:
      a threaded bolt formed of a metallic material;
      a plurality of flat washers formed of a polymeric material;
      a lock washer formed of a polymeric material; and
      a plurality of nuts formed of a polymeric material,
   wherein the threaded bolt extends through the front and rear shell half bolt apertures and is secured with the plurality of flat washers, lock washer and plurality of nuts to retain the cable hanger to the support structure, and
   wherein the front shell half and the rear shell half are formed of a polymeric material.

2. The cable hanger assembly of claim 1, wherein the cable hanger comprises more than one cable receptacle.

3. The cable hanger assembly of claim 2, in combination with a plurality of discrete cables, wherein each of the plurality of discrete cables resides within a respective one of the cable receptacles of the cable hanger.

4. The cable hanger assembly of claim 1, wherein the polymeric material forming the plurality of flat washers, the lock washer, and/or the plurality of nuts comprises nylon, acetal, or polypropylene.

5. The cable hanger assembly of claim 1, wherein the threaded bolt is formed of a polymeric material.

6. The cable hanger assembly of claim 5, wherein the polymeric material forming the threaded bolt comprises nylon, acetal, or polypropylene.

7. The cable hanger assembly of claim 1, wherein the plurality of flat washers and/or the lock washer have a diameter of 6 mm to about 12 mm.

8. The cable hanger assembly of claim 1, wherein the plurality of flat washers and/or the lock washer are bent to have a concave cross-section.

9. A cable hanger assembly, the cable hanger assembly comprising:
   a support structure;
   a cable hanger, the cable hanger comprising:
      a front shell half that mates with a rear shell half, the front shell half and the rear shell half having a front shell half inner surface and a rear shell half inner surface that cooperate with each other to secure a cable within a cable receptacle;
      a front shell bolt aperture through the front shell half and a rear shell half bolt aperture through the rear shell half, wherein the front shell half bolt aperture aligns with the rear shell half bolt aperture when the front shell half is mated to the rear shell half;
   a mounting assembly, the mounting assembly comprising:
      a threaded bolt;
      a plurality of washers, wherein the plurality of washers have a concave cross-section;
      a lock washer formed of a polymeric material; and
      a plurality of nuts,
   wherein the threaded bolt extends through the front and rear shell half bolt apertures and is secured with the plurality of washers, lock washer and nuts to retain the cable hanger to the support structure, and wherein the plurality of washers maintain compression within the cable hanger assembly to accommodate creep over time.

10. The cable hanger assembly of claim 9, wherein the cable hanger comprises more than one cable receptacle.

11. The cable hanger assembly of claim 10, in combination with a plurality of discrete cables, wherein each of the plurality of discrete cables resides within a respective one of the cable receptacles of the cable hanger.

12. The cable hanger assembly of claim 9, wherein the polymeric material forming the lock washer comprises nylon, acetal, or polypropylene.

13. The cable hanger assembly of claim 9, wherein the threaded bolt, the plurality of washers and/or the plurality of nuts are formed of a polymeric material.

14. The cable hanger assembly of claim 13, wherein the polymeric material forming the plurality of washers, the plurality of nuts, and/or the threaded bolt comprises nylon, acetal, or polypropylene.

15. The cable hanger assembly of claim 9, wherein the lock washer have a concave cross-section.

16. A cable hanger assembly, the cable hanger assembly comprising:
   a support structure;
   a cable hanger, the cable hanger comprising:
      a front shell half that mates with a rear shell half, the front shell half and the rear shell half having a front shell half inner surface and a rear shell half inner surface that cooperate with each other to secure a cable within a cable receptacle;

a front shell bolt aperture through the front shell half and a rear shell half bolt aperture through the rear shell half, wherein the front shell half bolt aperture aligns with the rear shell half bolt aperture when the front shell half is mated to the rear shell half;

a mounting assembly, the mounting assembly comprising:
a threaded bolt;
a plurality of washers, wherein the plurality of washers have a concave cross-section; and
a plurality of nuts, wherein the threaded bolt extends through the front and rear shell half bolt apertures and is secured with the plurality of washers and nuts to retain the cable hanger to the support structure, and wherein the plurality of washers maintain compression within the cable hanger assembly to accommodate creep over time.

17. The cable hanger assembly of claim 16, wherein the cable hanger comprises more than one cable receptacle.

18. The cable hanger assembly of claim 17, in combination with a plurality of discrete cables, wherein each of the plurality of discrete cables resides within a respective one of the cable receptacles of the cable hanger.

19. The cable hanger assembly of claim 16, wherein the threaded bolt, the plurality of washers and/or the plurality of nuts are formed of a polymeric material.

20. The cable hanger assembly of claim 19, wherein the polymeric material forming the threaded bolt, the plurality of washers, and/or the plurality of nuts comprises nylon, acetal, or polypropylene.

* * * * *